(12) United States Patent
Christoph

(10) Patent No.: US 7,230,721 B2
(45) Date of Patent: Jun. 12, 2007

(54) ARRANGEMENT FOR MEASURING THE GEOMETRY OR STRUCTURE OF AN OBJECT

(75) Inventor: Ralf Christoph, Giessen (DE)

(73) Assignee: Werth Messtechnik GmbH, Giessen (DE)

( * ) Notice: Subject to any disclaimer, the term of this patent is extended or adjusted under 35 U.S.C. 154(b) by 97 days.

(21) Appl. No.: 10/532,128

(22) PCT Filed: Nov. 3, 2003

(86) PCT No.: PCT/EP03/12228

§ 371 (c)(1),
(2), (4) Date: Apr. 20, 2005

(87) PCT Pub. No.: WO2004/040234

PCT Pub. Date: May 13, 2004

(65) Prior Publication Data

US 2006/0023226 A1 Feb. 2, 2006

(30) Foreign Application Priority Data

Nov. 1, 2002 (DE) ................................ 102 51 412

(51) Int. Cl.
*G01B 11/24* (2006.01)
(52) U.S. Cl. ...................................... 356/601; 356/609
(58) Field of Classification Search ........ 356/601–612; 250/559.22, 201.1–201.5; 369/44.24, 44.23; 359/362–690
See application file for complete search history.

(56) References Cited

U.S. PATENT DOCUMENTS

| 4,277,130 A | 7/1981 | Takahashi ..................... 350/36 |
| 4,908,951 A | 3/1990 | Gurny |
| 5,033,856 A * | 7/1991 | Nose et al. .................. 356/609 |
| 5,359,416 A | 10/1994 | Mueller et al. |
| 6,181,422 B1 | 1/2001 | Veltze |
| 6,396,589 B1 | 5/2002 | Ebihara |

FOREIGN PATENT DOCUMENTS

| DE | 19747027 | 10/1998 |
| DE | 19733709 | 2/1999 |
| DE | 10056073 | 6/2002 |

* cited by examiner

Primary Examiner—Gregory J. Toatley, Jr.
Assistant Examiner—Tri Ton
(74) Attorney, Agent, or Firm—Dennison, Schultz & MacDonald

(57) ABSTRACT

An arrangement for measuring the geometry or structure of an object by means of a co-ordinate measuring device with an optical system for recording and reproducing a measured point on at least one optical sensor, whereby the optical system has at least one displaceable lens group having at least one measuring lens and at least some of the measuring lenses are supported in a housing. At least one further lens is arranged in at least some of the housings for supporting the measuring lenses of the at least one displaceable lens group, for the focusing of a light beam on the object.

15 Claims, 3 Drawing Sheets

ARRANGEMENT FOR MEASURING THE GEOMETRY OR STRUCTURE OF AN OBJECT

Figure 1:
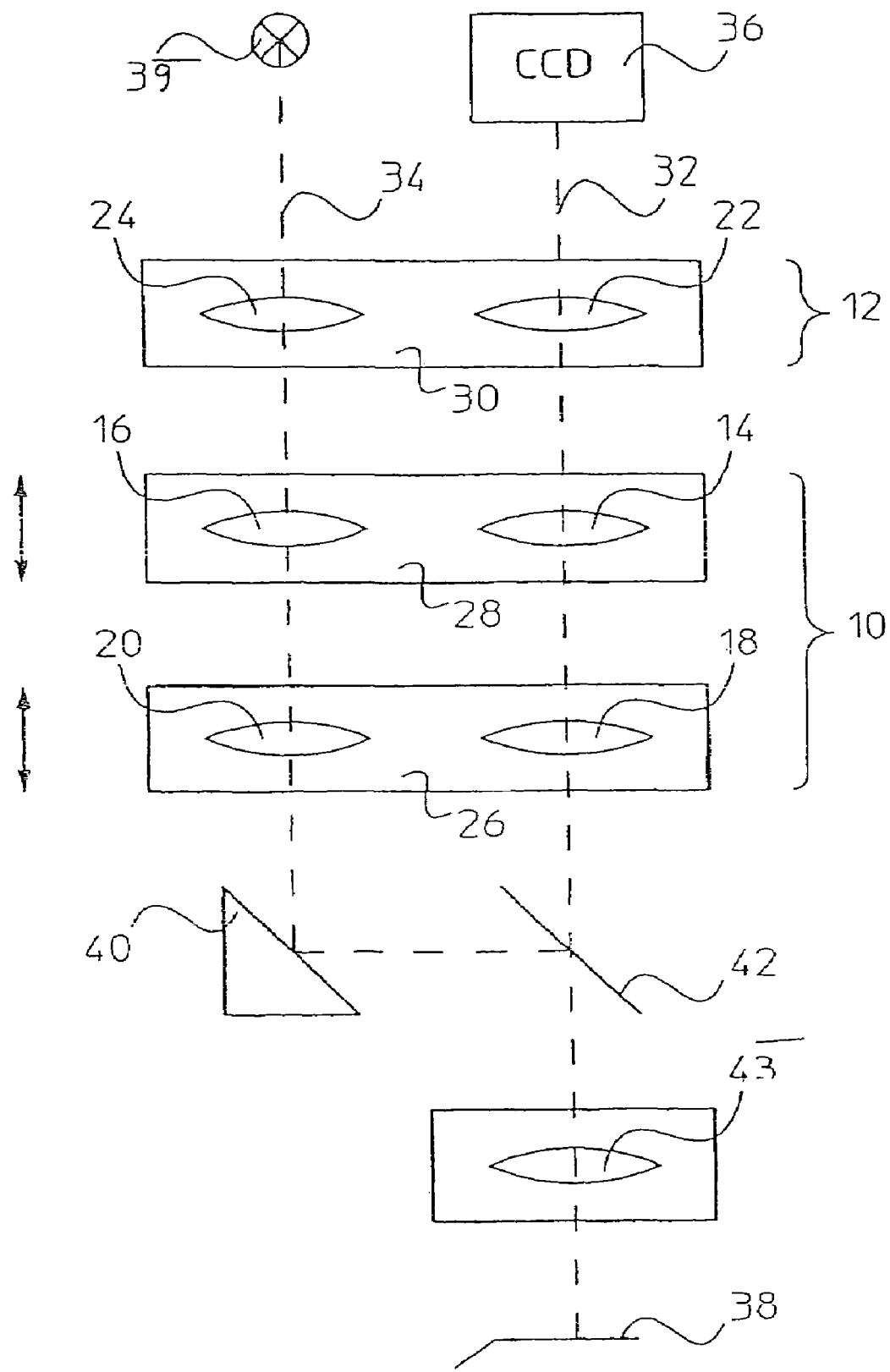

This application is a filing under 35 U.S.C. 371 of PCT/EP2003/012228, filed Nov. 3, 2003.

The invention relates to an arrangement for measuring the geometry or structure of an object by means of a coordinate measuring device consisting of a light source, from which a lighting beam path originates impinging on a measuring point of the object, as well as an optical system for capturing and imaging the measuring point of at least one optical sensor such as CCD (charge-coupled device) sensor, whereby the optical system comprises at least one movable lens group consisting of measuring lenses, and whereby at least some of the measuring lenses are held by one seat.

For employment in image processing systems for measuring technology, zoom lenses are particularly suitable as imaging systems. In this connection, systems are known in which only the enlargement can be adjusted, as well as systems in which both enlargement and working distance can be adjusted (DE 198 16 220 7.52).

In employing such systems, it is also necessary to achieve vertical lighting from above of the objects to be measured. In so-called bright field epi-illuminator lighting, this takes place through reflection of an illumination beam path into the zoom lens system. This often brings the disadvantage that illumination light reflections occur on individual optical contact surfaces, and therefore stray light in the imaging beam path deteriorates the image quality. To prevent this, the lighting can be arranged separately. As a consequence, the lighting intensity and the size of the lighting spot are not adjusted to the respective magnification of the zoom lens system.

Systems are also known, in which distance sensors, such as laser distance sensors, are also integrated into the optical system (DE 100 49 303 A1). Here too, it is difficult to optimize the optical properties of the zoom lens system to the image processing requirement, as well as to the laser sensor technology. On the other hand, this problem is partially solved by separate in-reflection, though with the associated disadvantage of lesser flexibility, since no adjustment corresponding to zoom takes place.

DE 100 56 073 A1 as well as U.S. Pat. No. 4,277,130 relate to stereo zoom lens systems. Optical systems are thereby aligned to each other in such a way, that the beam paths passing through each partial system are aligned to each other at an acute angle, focused on a common sharp point.

From U.S. Pat. No. 5,359,417, an operation microscope for computer-assisted, stereo tactical microsurgery is known. A beam is thereby coupled out of the path of the microscope, in order to be imaged via a projection lens onto a CCD sensor. The applied optical system comprises lenses adjustable to each other. The beams impinging from the optical systems onto the object to be measured, converge at the measuring point.

From DE-A-100 56 073 an optical procedure as well as a sensor for gaining a 3D-scatterplot are known. In this, a first zoom optical system is arranged to the light source, and a second zoom optical system is arranged to a CCD-camera, both systems having the same zoom factor. The beams impinging on a measuring object thereby converge in the measuring area.

The objective of the present invention is to prevent the aforementioned disadvantages, and to provide an arrangement in which optimization of the lighting occurs, while preventing any interfering reflections.

According to the invention, the problem is solved in principle in that in some of the seats holding the measuring lenses of the at least one movable lens group, at least one additional lens for imaging of a light beam onto the object is arranged, According to the invention, several beam paths are combined in parallel within the mechanical construction of at least one, but preferably several adjustable lens groups for adjusting the magnification and/or the working distance, especially of a zoom lens system. Thereby, the optical axis of the measuring lenses runs in parallel to the optical axis of the imaging lenses in the area of the movable lens groups. Below the movable lens group, i.e., on the object side of it, when the seats contain measuring lenses and, as additional lenses, such lenses for lighting the object, the beam going through the lighting lenses is then diverted into the optical axis of the measuring lenses. This may occur by means of mirrors or beam splitters.

In this way, the mechanical expenditure for the complete system can be kept constant, and at the same time the various requirements with various lens groups can be fulfilled. In particular, a zoom lens system with adjustable lenses suitable for magnification or changes of the working distance is distinguished by the characteristic that in each lens seat the imaging lenses for two or more parallel running imaging beam paths are contained. Thereby, one beam path can be optimized for the requirements of an image processing lens system, and a second beam path, for the requirements of bright field lighting. It is furthermore provided for, that a beam path is optimized according to the requirements of an image processing lens system, and another one according to the requirements of a laser distance sensor. The respective beams go through separate lenses, which, however, are held by common seats, which in turn are formed on the desired scale and adjustable according to the requirements, as can be gathered purely in principle from DE 198 16 270 A1 or DE 100 49 303 A1.

Also, more than two lenses may be held in one and the same seat, whereby a beam path is designed according to the requirements of an image processing lens system, a beam path according to the requirements of a laser distance sensor, and a beam path according to the requirements of a bright field epi-illuminator lighting. The respective lenses are integrated into the corresponding seats.

The lenses present in the respective seats may have the same optical properties; however, the antireflective coating may be optimized with respect to the use of various colored light.

Furthermore, for the lens system, i.e., the lenses for the image processing beam path, high-quality optical systems may be selected, and for the one or more other beam paths, lower quality optical systems with fundamentally the same nominal parameters.

Furthermore, the optical beam paths are to be combined by a deflection system in the front area of the lens system, i.e., on the object side, to a common beam path. As preferable, mirror systems or beam splitters are mentioned.

Furthermore, in addition to the movable lens assembly, a movable aperture may be integrated, which is arranged at the respectively required location for adjusting the object in such a way that a telecentric optical system can be realized.

There is also the option, that a so-called telecenter aperture is aimed on and off as needed into the optical beam path. The realization of a telecenter aperture may also be effectively included in the beam path by opening and closing.

Forms of the invention arise from the additional claims.

Further details, advantages, and features of the invention arise, not only from the claims, the features which can be gathered from them—individually and/or in combination, but also from the following description of a preferred embodiment, which can be gathered from the drawings.

Figure 2:
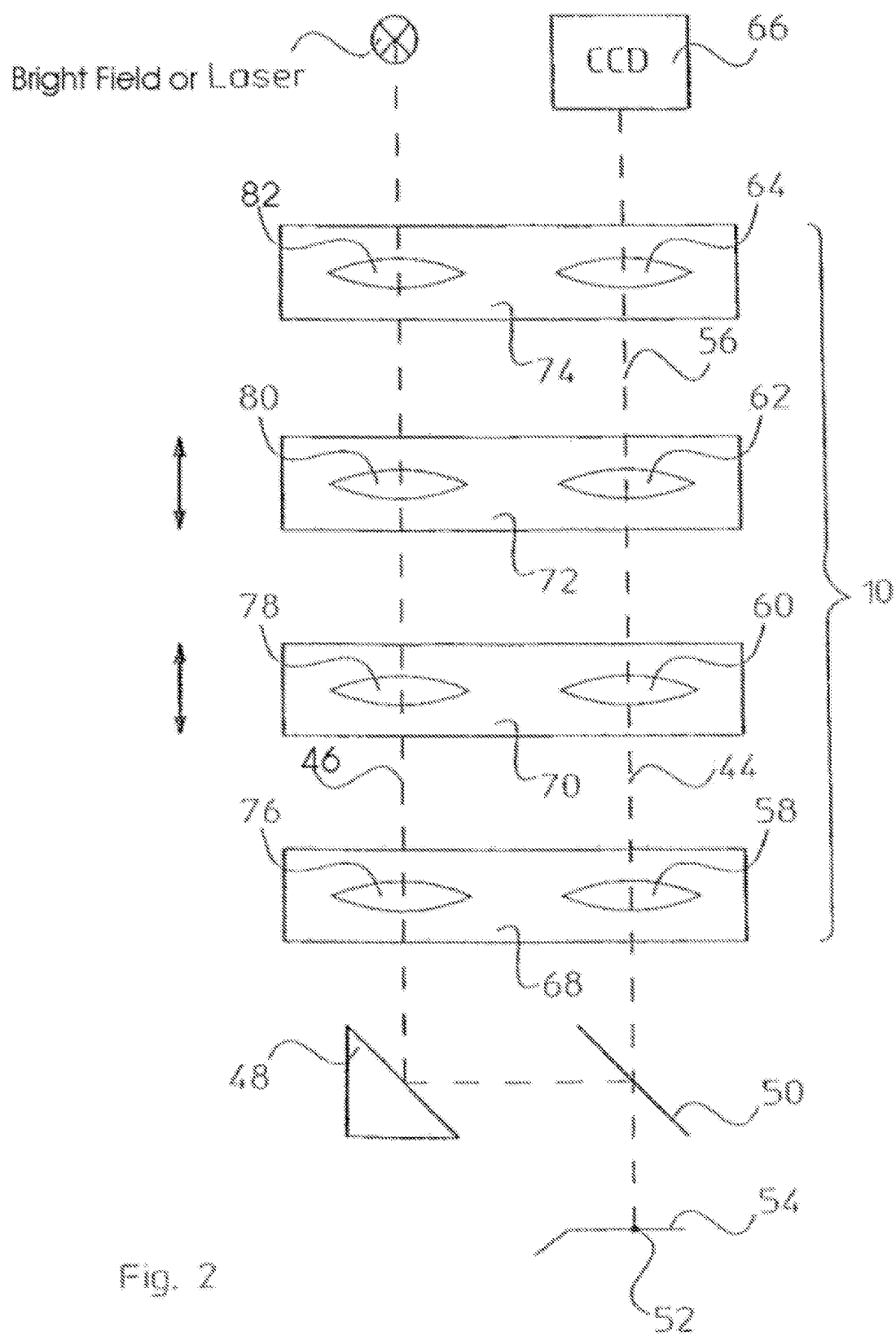

The diagrams show:

FIG. 1 a first embodiment of a lens system;

FIG. 2 a second embodiment of a lens system, and

Figure 3:
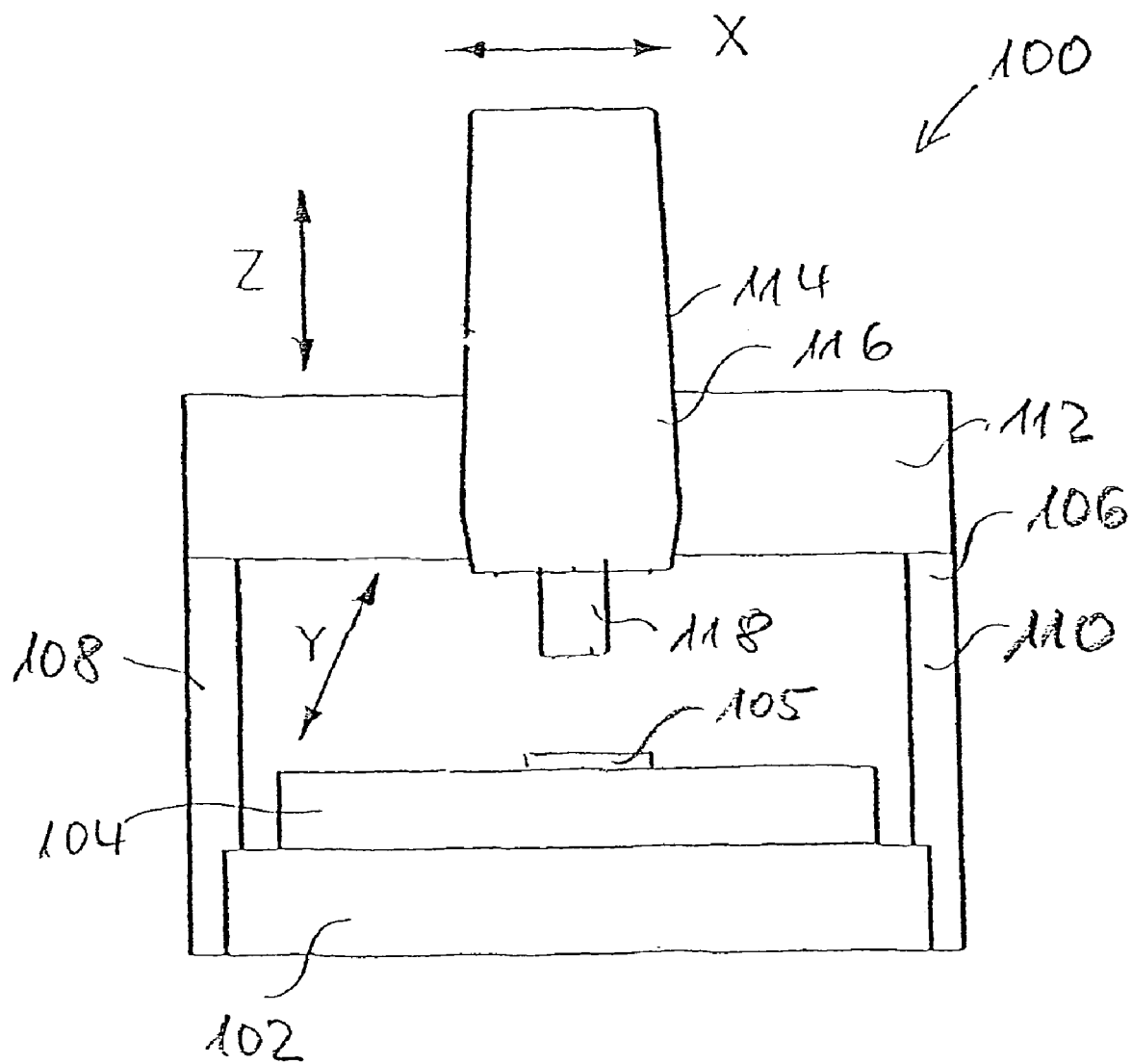

FIG. 3 a schematic diagram of a coordinate measuring device.

FIG. 3 schematically shows a coordinate measuring device 100 with a base frame 102 consisting, for example, of granite. On this, a measuring table 104 is arranged, on which there is a non-workpiece 105, which has to be measured.

Along the base frame 102, a portal 106 is movably arranged in the Y-direction of the coordinate measuring device 100. For this purpose, columns or stands 108, 110 are movably supported on the base frame 102. From the columns 108, 110, a traverse 112 originates, along which, a slide 114 is movably arranged, that is, in the X-direction of the coordinate measuring system in the embodiment, which in turn seats a sleeve or column 116, which can be adjusted in the direction of the Z axis. From the sleeve or column 116, or from an alternating intersection point, a sensor system 118 originates, which is described in more detail in FIG. 1 and 2, in order to measure the workpiece 105 arranged on the measuring table 104.

Correspondingly, in the embodiment of FIG. 1, the sensor system 118 comprises a first lens group 10 and a second lens group 12. Each lens group 10, 12 has several lenses 14, 16, or 18, 20, or 22, 24, whereby several lenses each originate from a common seat 26, 28, 30. In the embodiment, lenses 18,20 originate from seat 26, lenses 14, 16 from seat 28, and lenses 22, 24 from seat 30. If only two lenses per seat are shown in the embodiment, there might also exist more than two lenses in each seat according to the requirements.

The lenses 14, 16, 18, 20, 22, 24 contained in seats 26, 28, 30 are aligned to each other in such a way, that beam paths running parallel to each other can be formed. Thus, according to FIG. 1, the lenses 14, 18, 22 are arranged in a first row, and the lenses 16, 20 24, in a second row, with common optical axis 32, 34 each. Thereby, the lenses 14, 18, 22 are designed with a zoom lens system, to measure an object 38—in the illustration of FIG. 3, the workpiece 38—by means of an optical sensor such as CCD sensor 36 or camera. The seats 26, 28 can be adjusted, as is indicated by the arrows.

In order to be able to measure the object 38 in bright field epi-illuminator lighting, a light source 39 is arranged to the lenses 16, 20 24 aligned along the optical axis 34. The beam passing through the lenses 24, 16, 20 is then deflected onto the object 38 via a mirror 40 and a beam splitter 42, as well as an additional fixed lens 43 running on the object side. Thus, the light beam originating from the light source 39 and the beam necessary for measuring by means of the CCD sensor impinge on the same measuring point of the object 38.

The embodiment of FIG. 2 differs from the one in FIG. 1, in that a beam 46 running parallel to a measuring beam 44 outside of lenses, is deflected—in the embodiment—via a mirror 48 as well as a beam splitter 50 into the optical beam 44. Thus, the light beams 44, 46 impinge in the same spot 52 of an object 54. In the embodiment of FIG. 2, the measuring beam runs along an optical axis 56 of lenses 58, 60, 62, 64, which are focused on an optical sensor such as a CCD sensor 66. Furthermore, lenses 58, 60, 62, 64 originate from seats 68, 70, 72, 74, in which lenses 76, 78, 80, 82 are arranged, via which the beam 46 is imaged. The lenses 76, 78, 80, 88 may be intended for a bright field epi-illuminator lighting or a laser distance sensor.

The seats 70, 72 are adjustable (see arrows).

The disadvantages inherent in the state of the art, in particular the undesirable scattered light or light reflections, are avoided by the theory of the invention, and various requirements can be met with various lens groups without any additional mechanical expenditure. What is more, the lenses 58, 76, or 64, 68 originating from the seats 68, 74 are arranged fixed, and the lenses 60, 78, or 62, 80 originating from the seats 70, 72 are arranged movably to each other, to be able, for example, to be able to change magnification or working distance to the desired extent. Measurements are integrated with a laser distance sensor, or for a bright field epi-illuminator lighting measurement, without having to forfeit anything with respect to the quality.

The processing of the images resulting from the sensor 36 is done in the usual way. Thus, the images taken by the CCD sensor 36 may, for example, be digitized in an interface card in a computer. The image is then available on the computer, to be able to access for image processing purposes. These include numerical procedures for simple image enhancement, such as noise reduction, or increase in contrast, as well as more complex procedures for automatic feature extraction or pattern detection. The image processing computer may be, depending on the requirements, a PC, a workstation, or a parallel computer architecture.

The invention claimed is:

1. Arrangement for measuring the geometry or structure of an object by means of a coordinate measuring device comprising:
   means for holding the object;
   a light source, from which a first light beam originates impinging on a measuring point on the object;
   an optical sensor for capturing and imaging the measuring point on the object by way of a second light beam, parallel to the first light beam impinging on the measuring point on the object; and
   an optical system comprising at least one movable lens group containing a plurality of measuring lenses held in a common seat, each said lens group including a first lens in a path for the first light beam, and an second lens in line with the object in a path for the second light beam.

2. Arrangement according to claim 1, wherein the path of the first light beam is optimized for a bright field or laser distance sensor beam, and the path of the second light beam is optimized for an image processing beam.

3. Arrangement according to claim 1, wherein at least the first and second light beams meet on or on about one point of the object.

4. Arrangement according to claim 1, additionally comprising means for reflecting the first light beam into the path of the second light beam.

5. Arrangement according to claim 1, additionally comprising a lens adjacent the object in the paths of the first and second light beams.

6. Arrangement according to claim 1, wherein the second light beam passes through a plurality of lenses forming a zoom lens system comprising lenses which are adjustable in relation to each other for magnification and/or working distance change, each seat including lenses for at least two beam paths running in parallel to each other, the beam paths impinging on the object at the measuring point.

7. Arrangement according to claim 6, wherein at least some of the lenses are optimized with respect to light passing through them.

8. Arrangement according to claim 7, wherein the lenses are coated for optimization.

9. Arrangement according to claim 1, wherein the lenses of the first and second paths have the same optical properties.

10. Arrangement according to claim 9, wherein the lenses are optimized with an antireflective coating as a function of light color of the light beam passing therethrough.

11. Arrangement according to claim 1, wherein the at least one lens of the second light path has high-quality optical properties, and the at least one lens of the first light path has lower quality optical properties with fundamentally the same nominal parameters.

12. Arrangement according to claim 1, additionally comprising a mirror system for combining the first and second light beams in a common beam path adjacent the object.

13. Arrangement according to claim 1, additionally comprising a movable aperture for realizing a telecentric optical system.

14. Arrangement according to claim 13, wherein the aperture is arranged in an beam path, and can be moved into and out of the path as needed.

15. Arrangement according to claim 14, wherein the aperture can be introduced in the beam path by opening or closing.

* * * * *